US008185435B2

(12) United States Patent
Aaron et al.

(10) Patent No.: US 8,185,435 B2
(45) Date of Patent: May 22, 2012

(54) METHODS, SYSTEMS, AND COMPUTER PROGRAM PRODUCTS FOR FACILITATING CONTENT-BASED SELECTION OF LONG-TAIL BUSINESS MODELS AND BILLING

(75) Inventors: Jeffrey A. Aaron, Atlanta, GA (US); Thomas A. Anschutz, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1243 days.

(21) Appl. No.: 11/454,380

(22) Filed: Jun. 16, 2006

(65) Prior Publication Data

US 2007/0294733 A1   Dec. 20, 2007

(51) Int. Cl.
*G06Q 30/00* (2012.01)

(52) U.S. Cl. ............... 705/14.4; 705/14.55; 705/7.11; 715/205; 715/206; 715/207; 725/87; 386/239; 386/326

(58) Field of Classification Search .................. None
See application file for complete search history.

(56) References Cited

U.S. PATENT DOCUMENTS

| | | | | |
|---|---|---|---|---|
| 5,740,549 A * | 4/1998 | Reilly et al. | ............... | 705/14.42 |
| 5,819,092 A * | 10/1998 | Ferguson et al. | ............. | 717/113 |
| 5,931,901 A * | 8/1999 | Wolfe et al. | .................... | 709/206 |
| 6,038,367 A * | 3/2000 | Abecassis | ..................... | 386/262 |
| 6,553,178 B2 * | 4/2003 | Abecassis | ..................... | 386/291 |
| 6,714,723 B2 * | 3/2004 | Abecassis | ..................... | 386/239 |
| 7,020,893 B2 * | 3/2006 | Connelly | ........................ | 725/97 |
| 7,051,212 B2 * | 5/2006 | Ginter et al. | .................. | 713/193 |
| 7,055,165 B2 * | 5/2006 | Connelly | .......................... | 725/9 |
| 7,080,030 B2 * | 7/2006 | Eglen et al. | ................. | 705/26.41 |
| 7,315,826 B1 * | 1/2008 | Guheen et al. | ............... | 705/7.29 |
| 7,630,986 B1 * | 12/2009 | Herz et al. | ............................. | 1/1 |
| 7,649,573 B2 * | 1/2010 | Casper et al. | ................. | 348/722 |
| 7,657,887 B2 * | 2/2010 | Kothandaraman et al. | ... | 717/176 |
| 7,664,872 B2 * | 2/2010 | Osborne et al. | ............... | 709/232 |
| 7,702,564 B2 * | 4/2010 | Guler et al. | ..................... | 705/37 |
| 7,925,973 B2 * | 4/2011 | Allaire et al. | ................. | 715/248 |
| 2001/0041053 A1 * | 11/2001 | Abecassis | ....................... | 386/83 |
| 2002/0194598 A1 * | 12/2002 | Connelly | ......................... | 725/39 |
| 2002/0194607 A1 * | 12/2002 | Connelly | ......................... | 725/87 |
| 2003/0023505 A1 * | 1/2003 | Eglen et al. | ..................... | 705/26 |
| 2003/0105721 A1 * | 6/2003 | Ginter et al. | .................... | 705/54 |

(Continued)

OTHER PUBLICATIONS

"Framework for adaptive content delivery in heterogeneous network environments" Wei-Ying Ma, Ilja Bedner, Grace Chang, Allan Kuchinsky, and HongJiang Zhang, Proc. SPIE 3969, 86 (1999), DOI:10.1117/12.373537.*

(Continued)

*Primary Examiner* — Romain Jeanty
*Assistant Examiner* — Gurkanwaljit Singh
(74) *Attorney, Agent, or Firm* — Myers Bigel Sibley & Sajovec, P.A.

(57) ABSTRACT

Methods, systems and computer program products for delivering content to customers of a service provider are provided. Upon receiving a request for content from a customer of a service provider, a position of the requested content on a content demand curve is determined. A business model to be associated with the requested content is selected, wherein the business model defines how the requested content is to be delivered to the customer and how the customer is to be billed for the requested content. The requested content is delivered to the customer according to the selected business model and the customer is billed according to the selected business model.

17 Claims, 5 Drawing Sheets

U.S. PATENT DOCUMENTS

| | | | |
|---|---|---|---|
| 2003/0152076 A1* | 8/2003 | Lee et al. | 370/389 |
| 2003/0206720 A1* | 11/2003 | Abecassis | 386/83 |
| 2003/0225628 A1* | 12/2003 | Sandholm et al. | 705/26 |
| 2004/0049470 A1* | 3/2004 | Ouimet | 705/400 |
| 2004/0111748 A1* | 6/2004 | Bushey et al. | 725/87 |
| 2004/0151187 A1* | 8/2004 | Lichtenstein | 370/395.21 |
| 2005/0086306 A1* | 4/2005 | Lemke | 709/206 |
| 2005/0139661 A1* | 6/2005 | Eglen et al. | 235/383 |
| 2005/0183127 A1* | 8/2005 | Ngo et al. | 725/90 |
| 2005/0246358 A1* | 11/2005 | Gross | 707/100 |
| 2006/0004704 A1* | 1/2006 | Gross | 707/2 |
| 2006/0069926 A1* | 3/2006 | Ginter et al. | 713/194 |
| 2006/0100729 A1* | 5/2006 | Daferner et al. | 700/100 |
| 2006/0126667 A1* | 6/2006 | Smith et al. | 370/486 |
| 2006/0130107 A1* | 6/2006 | Gonder et al. | 725/110 |
| 2006/0167784 A1* | 7/2006 | Hoffberg | 705/37 |
| 2007/0038567 A1* | 2/2007 | Allaire et al. | 705/50 |
| 2007/0038931 A1* | 2/2007 | Allaire et al. | 715/526 |

OTHER PUBLICATIONS

"An Adaptive Approach to Content-Based Subscription in Mobile Ad Hoc Networks" Eiko Yoneki and Jean Bacon, Proceedings of the Second IEEE Annual Conference on Pervasive Computing and Communications Workshops (PERCOMW 2004).*

Haskin, R.L.; Stein, F.L.; , "A system for the delivery of interactive television programming," Compcon '95. Technologies for the Information Superhighway, Digest of Papers., vol., No., pp. 209-215, Mar. 5-9, 1995 doi: 10.1109/CMPCON.1995.512388.*

Little, T. D., Ahanger, G., Folz, R. J., Gibbon, J. F., Reeve, F. W., Schelleng, D. H., and Venkatesh, D. 1993. A digital on-demand video service supporting content-based queries. In Proceedings of the First ACM international Conference on Multimedia (Anaheim, California, United States, Aug. 2-6, 1993). Multimedia '93. ACM, New York, NY, 42.*

"Prospects for Interactive Video-on-Demand" T.D.C. Little and D. Venkatesh, MCL Technical Report (Feb. 15, 1994), In IEEE Multimedia, vol. 1, No. 3, Fall 1994, pp. 14-24.*

"An Analysis of Internet Content Delivery Systems" Stefan Saroiu, Krishna P. Gummadi, Richard J. Dunn, Steven D. Gribble, and Henry M. Levy, Proceedings: 5th Symposium on Operating Systems Design and Implementation (OSDI), Boston MA, Dec. 2002.*

"Optimized Regional Caching for On-Demand Data Delivery" Derek L. Eager et al., Proc. SPIE vol. 3654, p. 301-316, Multimedia Computing and Networking 1999.*

* cited by examiner

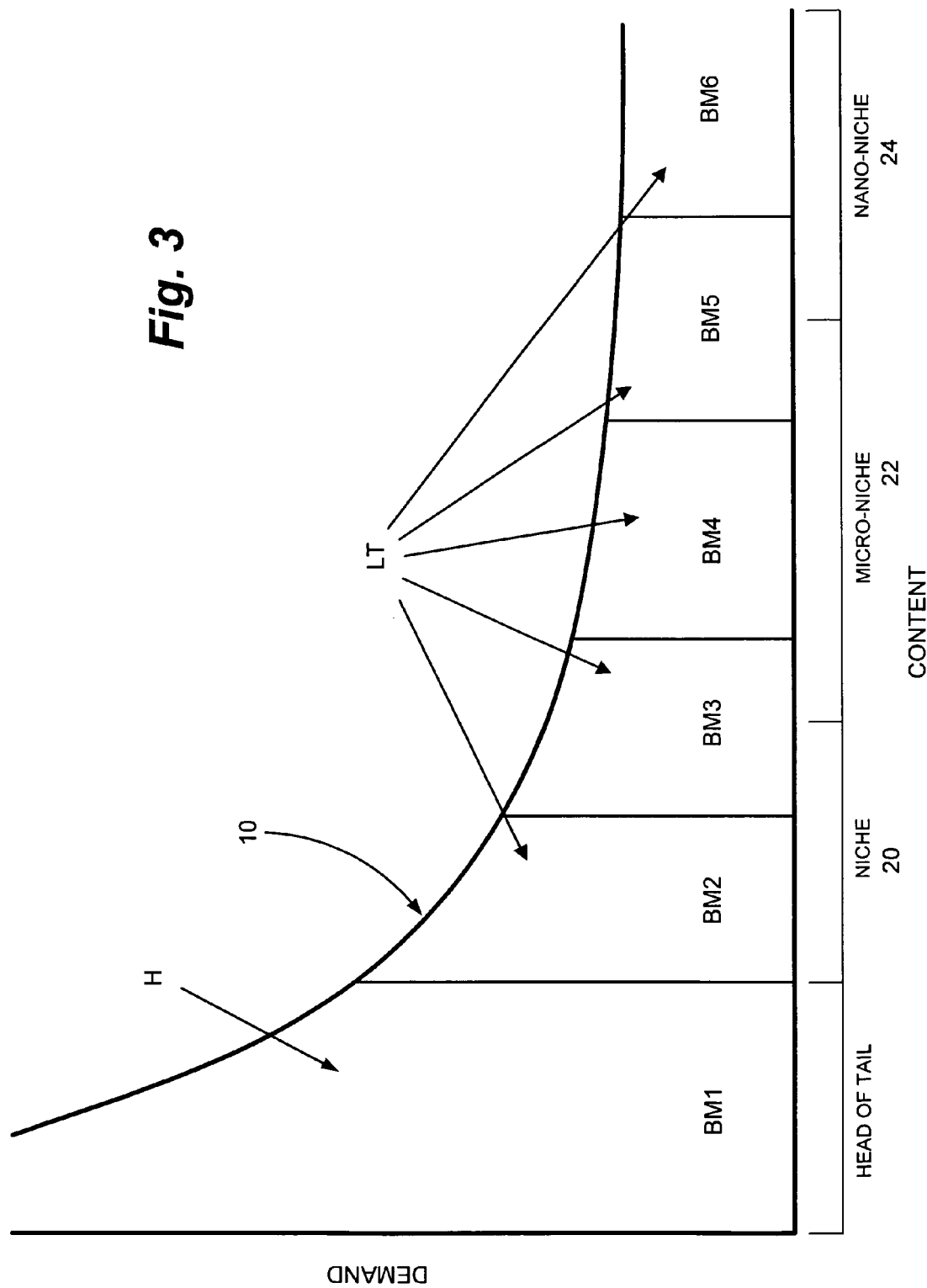

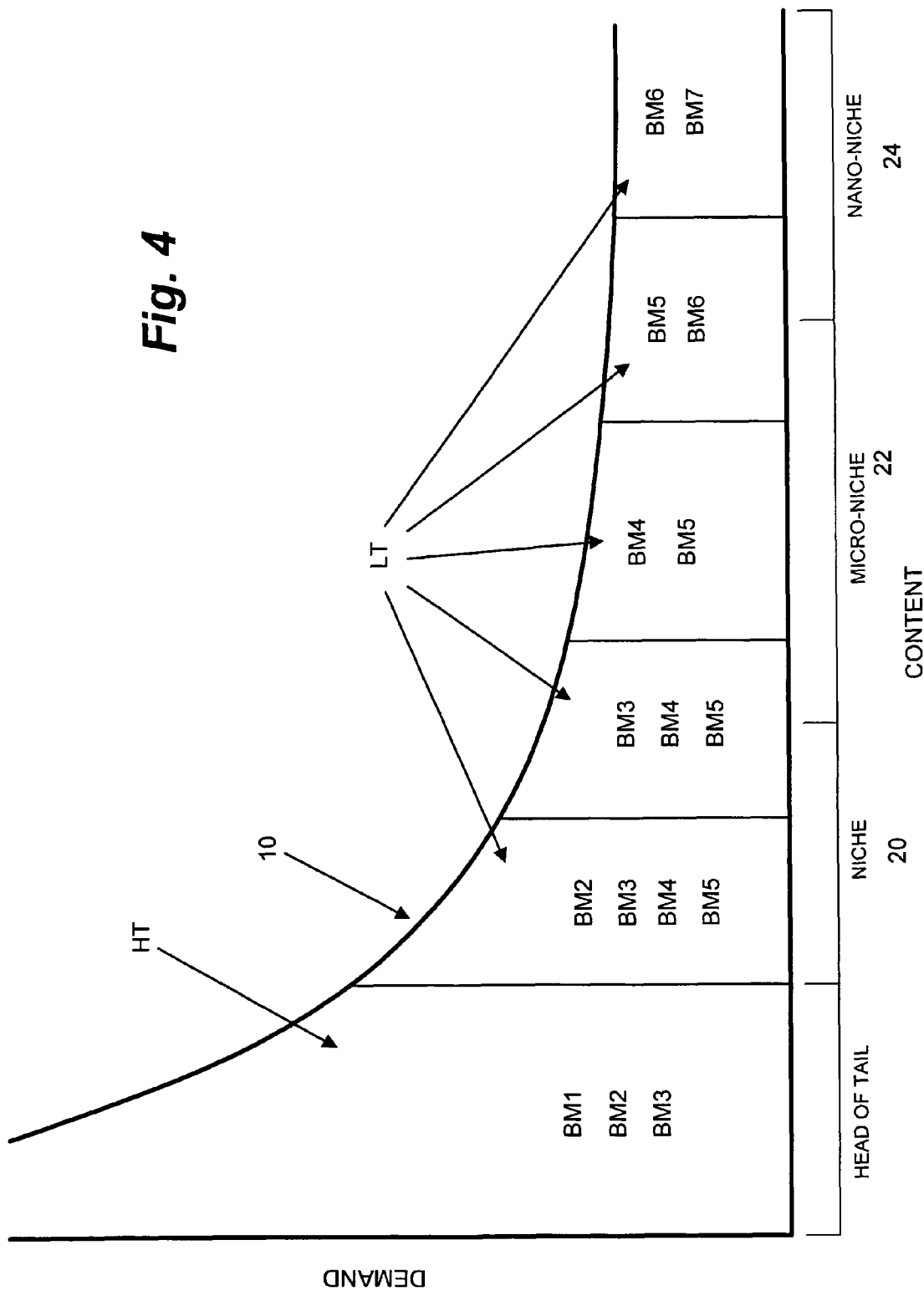

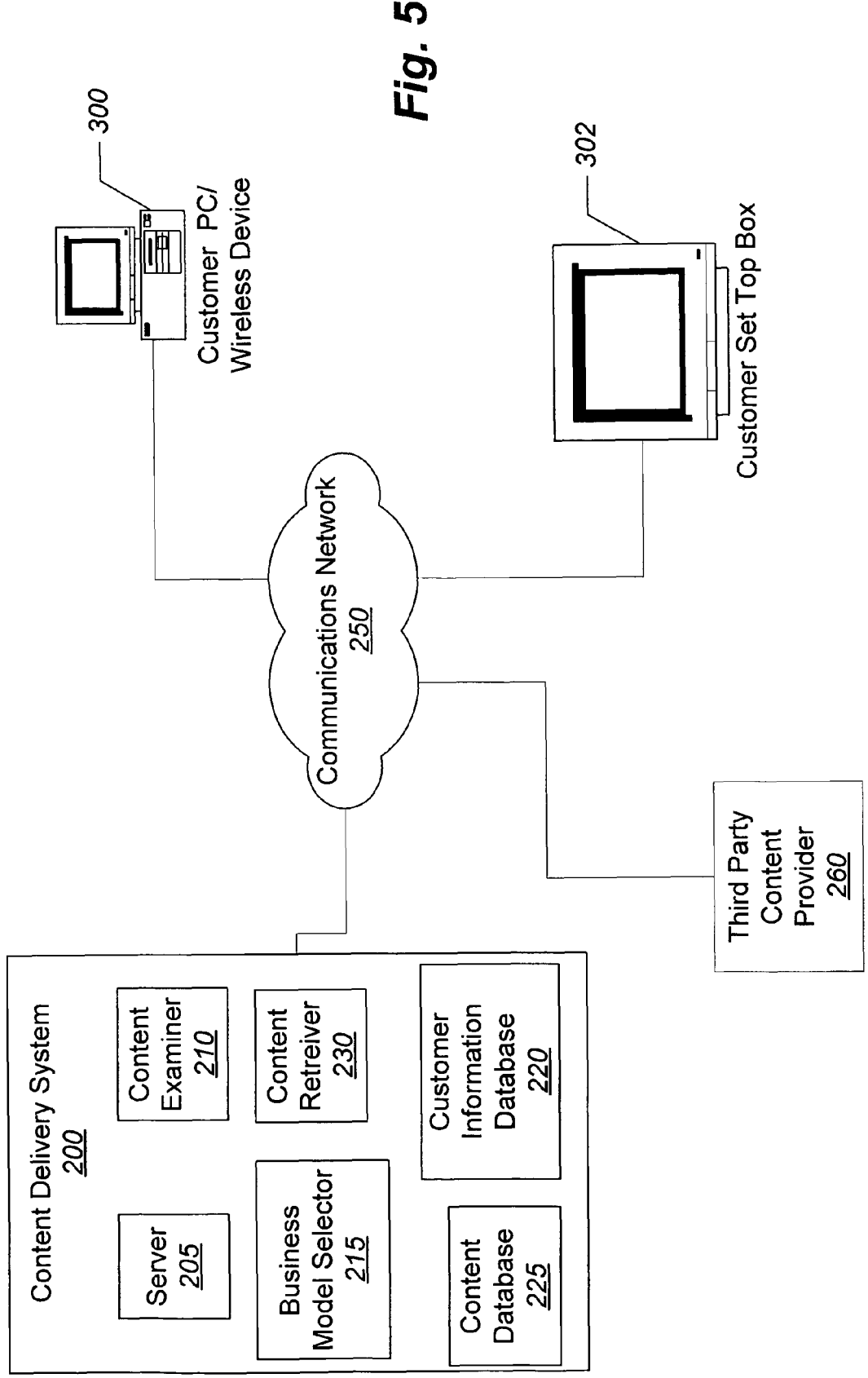

METHODS, SYSTEMS, AND COMPUTER PROGRAM PRODUCTS FOR FACILITATING CONTENT-BASED SELECTION OF LONG-TAIL BUSINESS MODELS AND BILLING

FIELD OF THE INVENTION

The present invention relates to communications networks, and, more particularly, to methods, systems, and computer program products for providing content via communications networks.

BACKGROUND OF THE INVENTION

Communications networks are widely used for nationwide and worldwide communication of voice, multimedia and/or data. As used herein, the term Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

Television networks include both traditional broadcast networks as well as cable and satellite television networks. The combination of the Internet, wireless/wireline telecommunication networks, television networks, and the like may provide a user with many sources for content.

Referring to FIG. 1, a demand curve 10 representative of the demand for goods/services of virtually any industry, is illustrated. The portion of the curve designated as "H" indicates products/services referred to as "head-of-tail" products/services i.e., products/services which traditionally have dominated industry sales. For example, in the music and book industries, head-of-tail sales are traditionally known as "hits" or "best sellers." The part of the demand curve 10 designated as "LT" indicates products/services know as "long tail" products/services. Long tail products/services are the non-hits, or niches, which is where many marketers believe new growth is coming from for many industries. For example, conventional retail stores stock the likely hits, because of the finite amount of shelf space, and because shelf space is expensive. However, online retailers (e.g., Amazon, Apple Computer's iTunes, etc.) can stock virtually everything since storage is not an issue. In virtually every industry, the number of available niche products/services (i.e., long tail products/services) may outnumber the hits by several orders of magnitude.

With respect to on-line content (e.g., audio content, video content, etc.) there are many niches of long tail content that have been largely neglected by traditional content suppliers. Marketers have recently discovered that there is tremendous demand for long tail content and that demand is less hit-centric than previously thought. As a result, on-line content providers are increasingly searching for ways of exploiting long tail content. Moreover, on-line content providers are searching for ways of maximizing revenue from the exploitation of long tail content.

SUMMARY OF THE INVENTION

According to some embodiments of the present invention, a method of delivering content to customers of a service provider includes receiving a request for content from a customer; determining a position of the requested content on a content demand curve; selecting a business model to be associated with the requested content, wherein the business model defines how the requested content is to be delivered to the customer and how the customer is to be billed for the requested content; and delivering the requested content to the customer according to the selected business model. A customer request may be received from any of various devices and may be a request for any type of audio content, video content, audio/video content, and/or text content that can be delivered via a telecommunications network. A business model defines how requested content is to be delivered to the customer and how the customer is to be billed for the requested content. Once a business model has been associated with the requested content, the requested content is delivered to the customer as defined by the business model and the customer is required to pay for the content as defined by the business model.

According to some embodiments of the present invention, a content delivery system for delivering content to customers of a service provider includes a server that is configured to receive requests for content from customers and deliver requested content according to a selected business model via a communications network; a content examiner that is configured to determine the position of requested content on a content demand curve; and a business model selector that is configured to select one or more business models to be associated with requested content.

According to some embodiments of the present invention, a content delivery system may include a customer database that maintains information about customers of the service provider, a content database that maintains head of tail content and/or long tail content, and a content retriever that retrieves requested long tail content from third parties.

Although described primarily above with respect to method and system aspects of the present invention, it will be understood that the present invention may also be embodied as computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

FIGS. 3 and 4 are demand curves that illustrate the association of business models with long tail content and head-of-tail content, according to some embodiments of the present invention.

FIG. 5 is a block diagram that illustrates a software/hardware architecture for delivering content to customers, according to some embodiments of the present invention.

DETAILED DESCRIPTION OF EMBODIMENTS OF THE INVENTION

Figure 1:
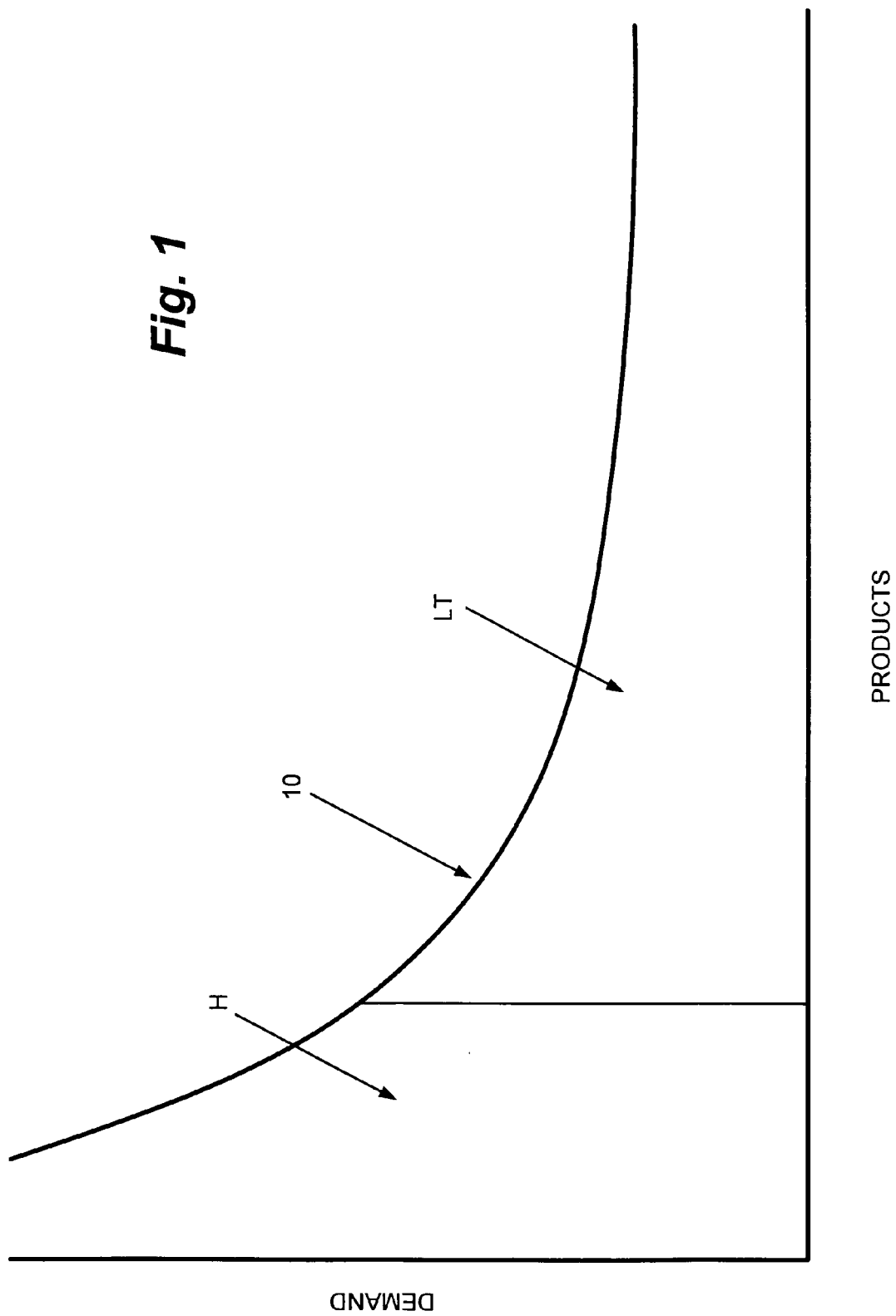
FIG. 1 is a demand curve that illustrates long tail content and head-of-tail content.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "content" means any type of audio content, video content, audio/video content, text, gaming content, interactive content, application content, etc., that can be delivered via a communications network. For example, content may include television programs, movies, voice messages, music and other audio files, electronic mail/messages, World Wide Web (WWW) pages, interactive games, educational materials, software applications, etc.

Computer program code for carrying out operations of data processing systems discussed herein may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for delivering content and for associating and applying business models therewith, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Exemplary operations for delivering content to customers, according to embodiments of the present invention, will now be described with reference to FIG. 2. Operations begin at (Block 100) where a request for content from a customer is received by a service provider. The customer request may be generated in whole or in part from any of various customer devices including, but not limited to, television set top boxes, personal computers, wireless communications devices, etc. Moreover, customer requests may be received via a web site of the service provider. Requested content may include any type of audio content, video content, audio/video content, text, gaming content, interactive content, application content, etc., that can be delivered via a telecommunications network.

Information about the customer making the content request may be obtained (Block 110). Customer information may be obtained in various ways. For example, the requesting customer may be required to provide information, for example, via a web site, via e-mail, etc. Information about the requesting customer may be retrieved from various sources, as well, such as customer information databases, public records databases and sources, etc. Exemplary customer information includes, but is not limited to, information such as likes and dislikes, habits (e.g., the customer drinks beer, smokes cigars, etc.), personal characteristics of the customer (e.g., the customer is bald, has a physical disability, etc.), age, sex, marital status, political affiliation, occupation, nationality, ethnicity, culture, location, residence, previous content order history, previous content payment history, business model preferences and/or history (e.g., when a choice was offered and/or preference was solicited and/or inferred), etc.

The position of the requested content on a demand curve, such as that illustrated in FIG. 1, is determined (Block 120). For example, a determination is made whether the requested content is head-of-tail content (H in FIG. 1) or long tail content (LT in FIG. 1). Head-of-tail content typically is hosted by the service provider, though it need not be. As described above, head-of-tail content is traditionally content that is most in demand (i.e., "hits" which traditionally have dominated industry sales). Long tail content traditionally is content that is less often in demand (i.e., "non-hits", or "niche content"). For example, movies produced by Hollywood studios would likely be classified as head-of-tail content, while eclectic movies produced by lesser known studios would likely be classified as long tail content.

Figure 2:
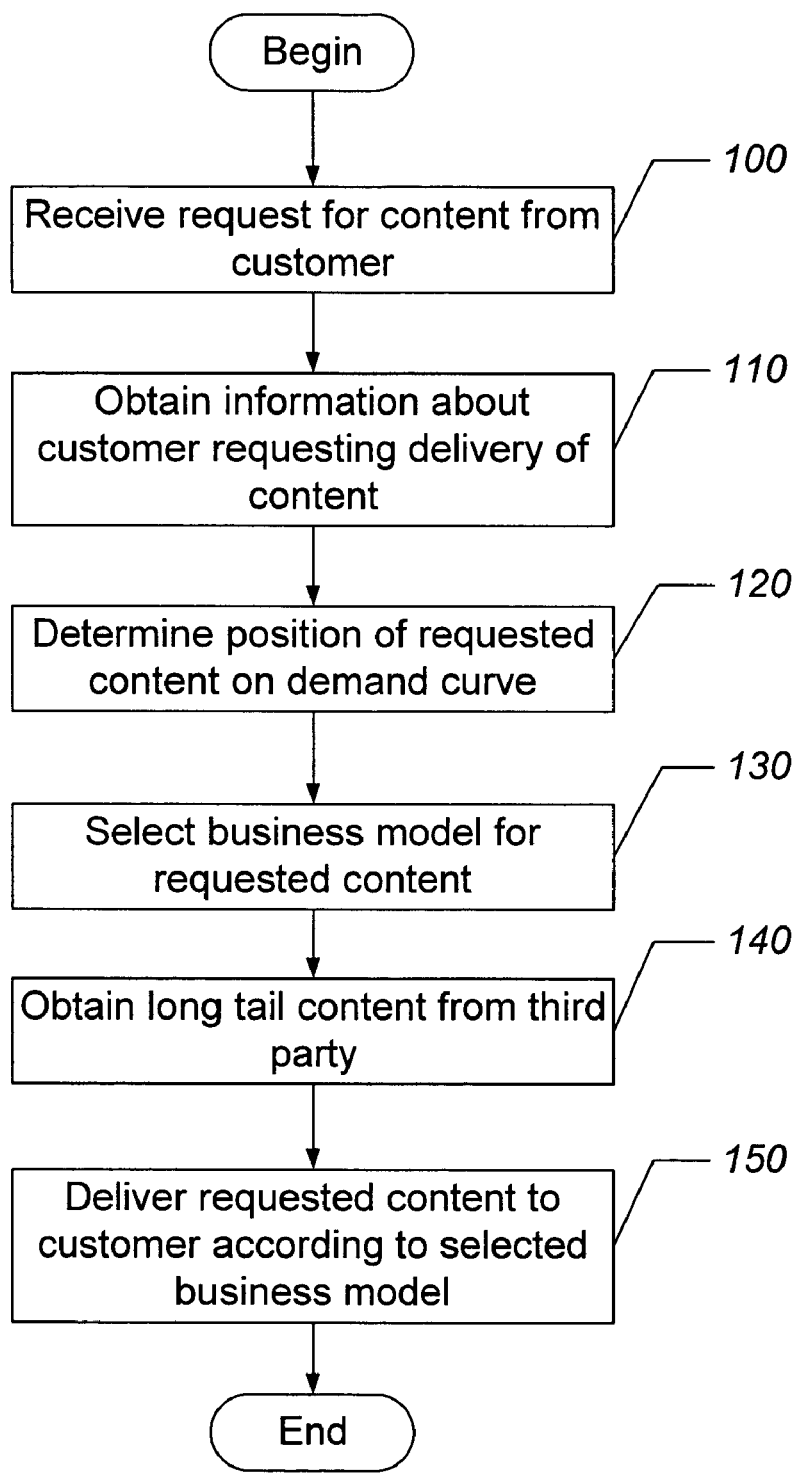
FIG. 2 is a flow chart that illustrates exemplary operations for delivering content to customers, according to embodiments of the present invention.

Still referring to FIG. 2, the business model to be associated with the requested content is then selected (Block 130). The term "business model" refers to how the requested content is to be delivered to the customer and how the customer and/or a third party is to be billed for the requested content. For example, referring to FIG. 3, content defined by a demand curve 10 has been divided up into head-of-tail and long tail portions H, LT, respectively. The long tail portions have been further divided into a "niche" portion 20, a "micro-niche" portion 22, and a "nano-niche" portion 24. Multiple business models, designated BM1-BM6 have been associated with discrete portions of the content under the demand curve 10, as illustrated. However, embodiments of the present invention are not limited to the illustrated association of business models. Multiple business models may be associated with the same discrete portions of content, as illustrated in FIG. 4.

According to some embodiments of the present invention, a business model may be selected based upon information about the customer requesting the content. As described above, exemplary customer information may include, but is not limited to, customer likes and dislikes, habits, personal characteristics, age, sex, marital status, political affiliation, occupation, nationality, ethnicity, culture, location, residence, previous content order history, previous content payment history, business model preferences and/or history, etc.

Each business model contains rules that define how content is to be delivered to a customer and how the customer is to be billed for the delivered content. In addition, for content obtained from third parties, a business model associated therewith may contain rules for how to pay royalties to the third party. Exemplary content delivery methods include, but are not limited to, multicast and unicast. As known to those skilled in the art, multicast content is broadcast or streamed to a set of interested receivers according to a common schedule. For example, a television show is streamed at 7:00 pm and customers "tune in" to the stream by selecting to join a multicast group. Also, as known to those skilled in the art, unicast content is broadcast or streamed to a single receiver and does not require a common schedule.

Additional content delivery mechanisms that can be utilized in accordance with embodiments of the present invention include "buffer and play," "download and play," and "prepositioning." Each of these content delivery mechanisms can be implemented via analog or digital communications technologies.

As known to those skilled in the art, "pay-per-view" enables a customer to order and view content (e.g., movies and events) on an individual basis. In pay-per-view, a customer pays to view the content one time.

According to some embodiments of the present invention, a selected business model may require that the requested content be delivered with advertising bundled therewith. For example, a requested movie may be bundled with a video ad for a product/service. Moreover, the advertising may somehow be related to the content. For example, the advertising may be for a product/service that appears in the requested content (e.g., a car that appears in a movie, etc.).

According to some embodiments of the present invention, a selected business model may require the requested content be delivered with other content bundled therewith. For example, a requested movie may be bundled with another movie, etc.

According to some embodiments of the present invention, a selected business model may define how a customer and/or a third party is to be billed for requested content. For example, subsequent to delivering content to a requesting customer, the customer can be billed for the content. Alternatively, the customer can be billed in advance or at the time of delivery of the requested content. As another example, an on-line retailer may provide content to a customer free of charge. However, the service provider provides the content to the on-line retailer and bills the retailer (i.e., the third party).

According to some embodiments of the present invention, a selected business model may require a subscription for the requested content for a period of time. Accordingly, delivering requested content to a customer may include subscribing the customer for the period of time.

Referring back to FIG. 2, if the requested content is long tail content maintained by a third party, the content is obtained from the third party (Block 140). Obtaining content from a third party may include receiving the content from the third party or directing the third party to deliver the content to the customer directly. The selected business model for the content obtained from a third party may also define how royalties are to be paid to the third party, if any.

Once a business model has been associated with the requested content, the requested content is delivered to the customer as defined by the business model (Block 150) and the customer is required to pay for the content as defined by the business model.

Referring to FIG. 5, a content delivery system 200 for delivering content to customers of a service provider, according to some embodiments of the present invention, is illustrated. The illustrated content delivery system 200 includes a server 205 that is configured to receive requests for content from customers and deliver requested content according to a selected business model via a communications network 250. The illustrated content delivery system 200 also includes a content examiner 210 that is configured to determine the position of requested content on a content demand curve, and a business model selector 215 that is configured to select one or more business models to be associated with requested content. The illustrated content delivery system 200 also includes a customer database 220 that maintains information about customers of the service provider, a content database 225 that maintains head of tail content and/or long tail content, and a content retriever 230 that retrieves requested content from third parties 260.

The communications network 250 may represent a global network, such as the Internet, or other publicly accessible network. The communications network 250 may also, however, represent a wide area network, a local area network, an Intranet, or other private network, which may not accessible by the general public. Furthermore, the communications network 250 may represent a combination of public and private networks or a virtual private network (VPN). The communications network 250 may also contain transmissions over-the-air or through a dedicated distribution network. The communications network 250 may also be wireless or wireline, or may include wireless and wireline portions.

In operation, a user, via a device, such as a computing device 300 or set top box 302, connected to the communications network 250, sends a request for content to a service provider. The request is received by the server 205 of the content delivery system 200. The content examiner 210 determines the position of the requested content on a content demand curve. The business model selector 215 selects a business model to be associated with the requested content. As described above, the selected business model defines how the requested content will be delivered to the customer, and how the customer will be billed for the requested content. If the content is obtained from a third party, the selected business model will also define how the third party will be compensated for the content, if at all. In some embodiments, selection of business models may be accomplished using rules and/or algorithms and/or matching configured parameter ranges or choices to data obtained from customer information and/or content-related information.

Although FIG. 5 illustrates an exemplary content delivery system for delivering content to customers of a service provider, it will be understood that the present invention is not limited to such configurations, but is intended to encompass any configuration capable of carrying out the operations described herein.

FIGS. 2 and 5 illustrate the architecture, functionality, and operations of some embodiments of methods, systems, and computer program products for delivering content to customers of a service provider. In this regard, each block represents a module, segment, or portion of code, which comprises one or more executable instructions for implementing the specified logical function(s). It should also be noted that in other implementations, the function(s) noted in the blocks may occur out of the order noted in FIG. 2. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

That which is claimed:

1. A method of delivering media content to a customer of a service provider, comprising:
receiving, at a data processing apparatus, a request for the media content from the customer;
determining, via the data processing apparatus, a position of the requested content on a content demand curve,
wherein the content demand curve is representative of demand for the type of content requested based on sales data to previous customers,
wherein the content demand curve comprises a head of tail portion,
where the head of tail portion represents content that is most in demand, and a plurality of discrete long tail portions where the long tail portions represent content that is less in demand, and
wherein a business model is associated with the head of tail portion and wherein multiple business models are associated with each discrete long tail portion, wherein the business models define how the requested content is to be delivered to the customer and how the customer is to be billed for the requested content;
selecting, via the data processing apparatus, a business model associated with a portion of the content demand curve that the requested content belongs to, wherein selecting a business model to be associated with the requested content comprises selecting a model based on customer information, wherein customer information comprises at least one of: customer likes and dislikes, habits, personal characteristics, age, sex, marital status, political affiliation, occupation, nationality, ethnicity, culture, location, residence, previous content order history, previous content payment history, business model preferences and/or history; and
delivering, via the data processing apparatus, the requested content to the customer according to the selected business model.

2. The method of claim 1, wherein the customer request is generated via a set top box.

3. The method of claim 1, wherein the customer request is generated via a web site.

4. The method of claim 1, wherein content comprises audio content, video content, text content, gaming content, interactive content, and application content.

5. The method of claim 1, wherein content in the head of tail portion of the content demand curve is hosted by the service provider, and wherein content in the long tail portions of the content demand curve is hosted by third parties.

6. The method of claim 5, wherein the requested content comprises content in one of the long tail portions, wherein delivering the requested content comprises obtaining the content from a third party, and wherein the selected business model defines how royalties are to be paid to the third party.

7. The method of claim 1, wherein selecting a business model based upon information about the customer comprises obtaining information about the customer, via the data processing apparatus.

8. The method of claim 1, wherein selecting a business model based upon information about the customer comprises retrieving stored information about the customer, via the data processing apparatus.

9. The method of claim 1, wherein the selected business model defines bundling advertising with the requested content, and wherein delivering the requested content to the customer comprises delivering the requested content with bundled advertising, via the data processing apparatus.

10. The method of claim 1, wherein the selected business model defines bundling other content with the requested content, and wherein delivering the requested content to the customer comprises delivering the requested content with bundled content, via the data processing apparatus.

11. The method of claim 1, wherein the selected business model requires payment for the requested content, and wherein delivering the requested content to the customer comprises billing the customer for the requested content, via the data processing apparatus.

12. The method of claim 1, wherein the selected business model requires a subscription for the requested content for a period of time, and wherein delivering the requested content to the customer comprises subscribing the customer for the period of time, via the data processing apparatus.

13. A computer program product for delivering content to a customer of a service provider, comprising:
a non-transitory computer readable storage medium tangibly embodying a program executable with computer instructions, wherein the computer instructions comprise means for enabling a processor to:
receive a request for content from the customer;
determine a position of the requested content on a content demand curve, wherein the content demand curve is representative of demand for the type of content requested based on sales data to previous customers, wherein the content demand curve comprises a head of tail portion, where the head of tail portion represents content that is most in demand, and a plurality of discrete long tail portions where the long tail portions represent content that is less in demand, and wherein a business model is associated with the head of tail portion and wherein multiple business models are associated with each discrete long tail portion wherein the business models define how the requested content is to be delivered to the customer and how the customer is to be billed for the requested content;
select a business model associated with a portion of the content demand curve that the requested content belongs to, wherein selecting a business model to be associated with the requested content comprises selecting a model based on customer information, wherein customer information comprises at least one of: customer likes and dislikes, habits, personal characteristics, age, sex, marital status, political affiliation, occupation, nationality, ethnicity, culture, location, residence, previous content order history, previous content payment history, business model preferences and/or history; and
deliver the requested content to the customer according to the selected business model.

14. A system for delivering content to a customer of a service provider, comprising:
a processor;
memory coupled to the processor; and
a computer program code residing in the memory that, when executed by the processor, causes the processor to perform the following:
receive a request for content from the customer;
determine a position of the requested content on a content demand curve wherein the content demand curve is representative of demand for the type of content requested based on sales data to previous customers, wherein the content demand curve comprises a head of tail portion, where the head of tail portion represents content that is most in demand, and a plurality of discrete long tail portions where the long tail portions represent content that is less in demand, and wherein a business model is associated with the head of tail portion and wherein multiple business models are associated with each discrete long tail portion wherein the business models define how the requested content is to be delivered to the customer and how the customer is to be billed for the requested content; and
select a business model to be associated with a portion of the content demand curve that the requested content belongs to, wherein selecting a business model to be associated with the requested content comprises selecting a model based on customer information, wherein customer information comprises at least one of: customer likes and dislikes, habits, personal characteristics, age, sex, marital status, political affiliation, occupation, nationality, ethnicity, culture, location, residence, previous content order history, previous content payment history, business model preferences and/or history; and
deliver the requested content to the customer according to the selected business model.

15. The system of claim 14, further comprising a customer database that maintains information about customers of the service provider.

16. The system of claim 14, further comprising a content database that maintains head of tail content.

17. The system of claim 14, wherein the processor retrieves requested long tail content from third parties.

* * * * *

UNITED STATES PATENT AND TRADEMARK OFFICE
CERTIFICATE OF CORRECTION

PATENT NO. : 8,185,435 B2  
APPLICATION NO. : 11/454380  
DATED : May 22, 2012  
INVENTOR(S) : Aaron et al.

Page 1 of 1

It is certified that error appears in the above-identified patent and that said Letters Patent is hereby corrected as shown below:

Column 9, Claim 13, Line 39: correct "discrete long tail portions where"
to read -- discrete long tail portions, where --

Signed and Sealed this
Twenty-eighth Day of August, 2012

David J. Kappos
*Director of the United States Patent and Trademark Office*